United States Patent
Van Berkel et al.

(10) Patent No.: US 7,430,631 B2
(45) Date of Patent: Sep. 30, 2008

(54) ACCESS TO A WIDE MEMORY (75) Inventors: Cornelis Hermanus Van Berkel, Eindhoven (NL); Patrick Peter Elizabeth Meuwissen, Eindhoven (NL)

(73) Assignee: NXP B.V., Eindhoven (NL)

( * ) Notice: Subject to any disclaimer, the term of this patent is extended or adjusted under 35 U.S.C. 154(b) by 270 days.

(21) Appl. No.: 10/515,452

(22) PCT Filed: May 7, 2003

(86) PCT No.: PCT/IB03/01891

§ 371 (c)(1),
(2), (4) Date: Nov. 22, 2004

(87) PCT Pub. No.: WO03/100599

PCT Pub. Date: Dec. 4, 2003

(65) Prior Publication Data

US 2005/0240729 A1    Oct. 27, 2005

(30) Foreign Application Priority Data

May 24, 2002 (EP) .................................. 02077034
Sep. 4, 2002  (EP) .................................. 02078618

(51) Int. Cl.
*G06F 12/00* (2006.01)
(52) U.S. Cl. ................. 711/101; 711/105; 711/171
(58) Field of Classification Search .................. None
See application file for complete search history.

(56) References Cited

U.S. PATENT DOCUMENTS

| 4,949,247 | A | * | 8/1990 | Stephenson et al. | ............ 712/6 |
| 5,379,393 | A | * | 1/1995 | Yang | ............... 711/3 |
| 5,537,606 | A | * | 7/1996 | Byrne | ............ 712/7 |
| 5,689,653 | A | * | 11/1997 | Karp et al. | ............ 712/222 |
| 5,928,350 | A | * | 7/1999 | Shu et al. | ............ 712/4 |

* cited by examiner

*Primary Examiner*—Than Nguyen (57) ABSTRACT

A processing system includes a processor and a physical memory (500) with a single-size memory port (505) for accessing data in the memory. The processor is arranged to operate on data of at least a first data size and a smaller second data size. The first data size is equal to or smaller than the size of memory port. The processing system including at least one data register (514) of the first data size connected to the memory port (505), and at least one data port (525) of the second data size connected to the data register (525) and the processor for enabling access to data elements of the second size.

20 Claims, 3 Drawing Sheets

ACCESS TO A WIDE MEMORY

FIELD OF THE INVENTION

The invention relates to a processing system.

BACKGROUND OF THE INVENTION

Third generation wireless communication standards, such as UMTS-FDD, UMTS-TDD, IS2000, and TD-SCDMA, operate at very high frequencies. Modems (transceivers) for 3G mobile communication standards such as UMTS require approximately 100 times more digital signal processing power than GSM. It is desired to implement a transceiver for such standards using a programmable architecture in order to be able to deal with different standards and to be able to flexibly adapt to new standards. A known approach to improving performance is to store multiple data elements (scalars) in one line of a memory and operate on more than one data element at a time. Such systems are, for example, known as SIMD (single instruction, multiple data) or MIMD (multiple instruction, multiple data). A vector processor is an example of a SIMD processor. Typically, a wide memory has one port for enabling read and write access to units of at least one line of the memory. In the example, where the memory has a line width for storing a vector, one or more vectors can be read or written at a time. No special provision is available for accessing smaller units than a vector. For optimal use of a memory it is desired to be able to also access smaller data elements than those having the full width of a memory line in an efficient way. Conventionally, such a smaller unit can be stored in a line of the memory where part of the line is not used, increasing storage costs. Alternatively, smaller units may be stored in one line in a concatenated form, where an entire line needs to be read or written and additional processing instructions and cycles are required to extract or insert a desired smaller unit form the entire memory line. This reduces the performance. These problems become more acute where the width of the memory significantly exceeds the size of the smaller unit. For example, data elements storing components of a speech feature vector for speech recognition are typically 8 to 16 bits wide. For telephony, the coded/modulated data elements are usually 8 bits (or 2*8 bits for complex values). There is no need to increase this size. For newer telephony systems or increased speech recognition performance, it is desired to improve the speed of processing. Using wider memories to increase the processing speed can, without special measures, increase the amount of memory required for storing data or even slow-down certain forms of memory access as described above.

SUMMARY OF THE INVENTION

It is an object of the invention to provide a processor architecture that can provide fast memory access to a wide memory also for smaller data elements.

To meet the object, in a processing system with a processor and a physical memory with a single-size memory port for accessing data in the memory, the processor is arranged to operate on data of at least a first data size and a smaller second data size; the first data size being equal to or smaller than the memory port size; the processing system including at least one data register of the first data size connected to the memory port; and at least one data port of the second data size connected to the data register and the processor for enabling access to data elements of the second size.

In this way a conventional memory with one word size can be used. This keeps the memory costs down. Typically, the memory word size matches the largest word size of the processor. For accessing smaller data elements an intermediate register is used. An additional port is added that enables accessing a smaller data element in the register. Use of the intermediate register can be fully transparent. For the processor core and the programmer it looks like the memory has ports of different sizes. In this way, small data element can be accessed fast without additional instruction overhead such as selection and/or shifting of large data elements in order to access a smaller data element that is part of the larger data element.

As described in the dependent claim 2, the memory port size is at least twice the second data size. In this way, the register can store at least two small data elements. Particularly in the case where the small data elements are accessed sequentially, one access to the physical memory enables fast access to at least two sequential smaller data elements. This reduces the time lost in accessing the physical memory.

As described in the dependent claim 3, for a read data port a multiplexer is used for selecting and extracting a data element of the second data size from the data register under control of a read address. For example, the most significant part of the read address can be used for verifying whether the data element is already in the register (and if not using this part to retrieve it from the physical memory), whereas the least significant part can be used to select the data element in the register.

As described in the dependent claim 4, for a write data port a de-multiplexer is used for inserting a data element of the second data size at a selectable location in the data register under control of a write address. The selection can be done similar to as described for the read port.

As described in the dependent claim 5, the processing system can include a plurality of data ports of the second data size connected to the processor and for each of the data ports an associated respective data register connected to the respective data port and to a port of the physical memory. In this way, the average time for accessing data can be reduced further. For example, if an algorithm processes two sequential data streams each of the streams may be using one of the registers and data ports. Each stream can then access at least two sequential data elements using only one access to the physical memory.

As described in the dependent claim 6, a check is done for possible consistency conflicts caused by the registers containing a 'copy' of the data in the memory and/or in more than one register. The system enables maintaining updated data in the register, so that an update of a small data element does not always cause a write operation to the physical memory. Moreover, it also enables reading the updated small data element directly from the register, saving even further on memory access times. For write data ports (and thus the associated register allowing write access), the processor stores in an additional consistency register information on the data being stored in the register. This data is being used to check whether data being read (from the physical memory or from one of the registers) is accessing data that has been changed (but possibly not yet been updated to the memory or read registers). Preferably, the identifying information is a physical address for accessing a word in the physical memory where the word has a width of the memory port. In this way it is easy to check whether direct access to the physical memory is possibly in conflict with data stored in the registers.

As described in the dependent claim 8, the coherency checker includes a conflict resolver for, in response to detecting a possible consistency conflict, taking corrective steps. In this way, the programmer is relieved from having to take such measures while designing the program. One way of taking corrective steps, as described in the dependent claim 9, is to mark the data register as invalid for read access, causing a re-loading of content of the data register from the memory in response to a read access to the data register.

Alternatively, as described in the dependent claim 10, the coherency checker includes a coherency register for each respective data register for storing information identifying data stored in the respective data register; and the corrector being arranged to, in response to write access to one of the data registers and/or write access to the physical memory, taking corrective steps by copying content written to the data register or the memory to all other data registers and/or a location in the memory that according to the identifying information stores the same data. In this embodiment, updated data is copied to all registers that, according to the coherency registers should store the same data. If direct access to the physical memory is allowed this does include copying the data to the physical memory. Preferably, direct access to the physical memory for the large data elements also takes place via an intermediate register, in which case writing to a register does not automatically necessitate a write access to the memory.

As described in the dependent claim 11, at least one of the data registers (hereinafter "read register) is connected to a read data port and at least one of the data registers (hereinafter "write register") is connected to a write data port; and the processor includes a bypass path for selectably providing data from the write register to the read data port; the coherency checker including for each respective data register a coherency register for storing information identifying data stored in the associated data register; the conflict resolver being arranged to take corrective steps by in response to writing data into the write register activating the bypass path for successive read access to the read register if the read register according to the identifying information should store the same data element. By using a bypass a read register does not need to be reloaded as soon as a write register with the same content has been updated. Instead, the data is then read directly from the updated write register. In this way, access to the physical memory is kept low. It may sometimes cause a delay in accessing the write register.

Preferably, the physical memory is based on a single-ported SRAM that is cost-effective. In order to obtain a cost-effective wide physical memory, so that many small data elements can be stored in one memory word, it is preferred to use a physical memory is formed by a plurality of banks of RAM arranged in parallel. Preferably, the memory is embedded in the processor.

The described architecture can advantageously be used in a scalar/vector processor where the vector section operates on vectors of the first data size and the scalar section operates on scalars of the second data size, where the first data width is at least twice the second data width. In such an arrangement, the same memory can be sued for storing vectors as well as scalars. It also makes it easy to perform scalar operations on elements of the vector.

These and other aspects of the invention are apparent from and will be elucidated with reference to the embodiments described hereinafter.

DETAILED DESCRIPTION OF THE PREFERRED EMBODIMENT

Figure 1:
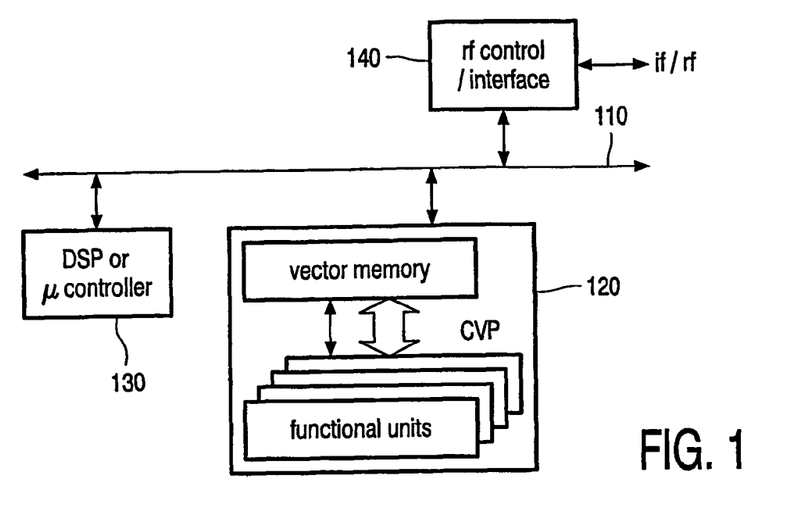
FIG. 1 shows a preferred configuration in which the scalar/vector processor according to the invention may be used.

The address generation unit (AGU) and memory unit are preferably used in a processor optimized for signal processing. Such a processor may be a DSP or any other suitable processor/micro-controller. The remainder of the description describes using the units in a highly powerful scalar/vector processor. Such a processor may be used stand-alone or in combination with another processor. FIG. 1 shows a preferred configuration in which the scalar/vector processor may be used. In this configuration, three main components are connected via a bus 110. The bus 110 connecting these three components may be any suitable bus, for example an AMBA High-speed Bus (AHB). The main components are:
the programmable scalar/vector processor 120 comprising functional units and a local data memory (referred to as vector memory in FIG. 1),
a micro-controller or DSP subsystem 130, including limited on-chip program and data memory;
an interface block 140.

The scalar/vector processor 120 is mainly used for regular, "heavy/duty" processing, in particular the processing of inner-loops. The scalar/vector processor includes vector processing functionality. As such, it provides large-scale parallelism for the vectorizable part of the code to be executed. The vast majority of all signal processing will be executed by the vector section of the scalar/vector processor. With an array of, for example, 32 identical processing elements executing the same instruction, it offers massive parallelism. Combined with a 32-word wide memory interface this leads to unprecedented programmable performance levels at low cost and moderate power-consumption. However, fully exploiting this parallelism is not always feasible, as many algorithms do not exhibit sufficient data parallelism of the right form. According to Amdahl's law, after vectorization of the directly vectorizable part of the code, most time is spent on the remaining code. The remaining code can be split into four categories:
address related instructions (e.g. incrementing a pointer into a circular buffer, using modulo addressing)
regular scalar operations (i.e. scalar operation that correspond to the main loop of the vector processor)
looping
irregular scalar operations The fractions of code for each of these categories is highly dependent on the algorithm executed. For example, the Golay correlator (used for P-SCH searching) requires a lot of address related instructions, but this is not the case for other algorithms such as the Rake. The performance of address related instructions and looping can be optimized by using the AGU/memory unit according to the invention. The operation of the regular scalar operation scan be optimized by tightly integrating scalar and vector processing in one processor. Study of all the algorithms relevant for 3G modems by the inventors has revealed that the fraction of irregular scalar operations is very limited. This property allows the separation of tasks between the scalar/vector processor 120 and the micro-controller or DSP 130 where the separate micro-controller or DSP 130 performs the irregular tasks and, preferably, controls the scalar/vector processor as well. In this preferred configuration, the scalar/vector processor 120 acts as a programmable, co-processor (in the remainder also referred to as CVP, Co-Vector Processor). The interface between the scalar/vector processor 120 and the micro-controller 130 deals with communication (e.g. through shared memory) and synchronization (e.g. through shared memory and status signals). The interface is preferably memory-mapped.

The interface block 140 allows the processors to interact with the remainder of the system. In the preferred embodiment, the scalar/vector processor is used as a software modem (transceiver) for 2G/3G mobile networks. For such a software modem function, the interface block 140 may include dedicated hardware as a front-end with as a main task to pass control and data words to the vector memory, for example DMA, under control of the micro-controller 130. The data in the vector memory is then processed by the scalar/vector processor.

The scalar/vector processor 120 may be a slave to the bus 110, whereas the micro-controller 130 and the interface block 140 (which may include a DMA unit) may act as a master. All the communication with the CVP, be it program, data, or control, is preferably memory mapped. The memory may be an off-chip DRAM, and this DRAM may also be used as (de-)interleaving memory by the scalar/vector processor.

In the description the phrase "address calculation unit" or ACU is mainly used. For the purpose of the description this is considered to be the same as "address generation unit" or AGU. The description focuses on using such units for calculating data addresses. Persons skilled in the art will be able to use the same functionality also for calculating instruction addresses ("loop control").

Figure 2:
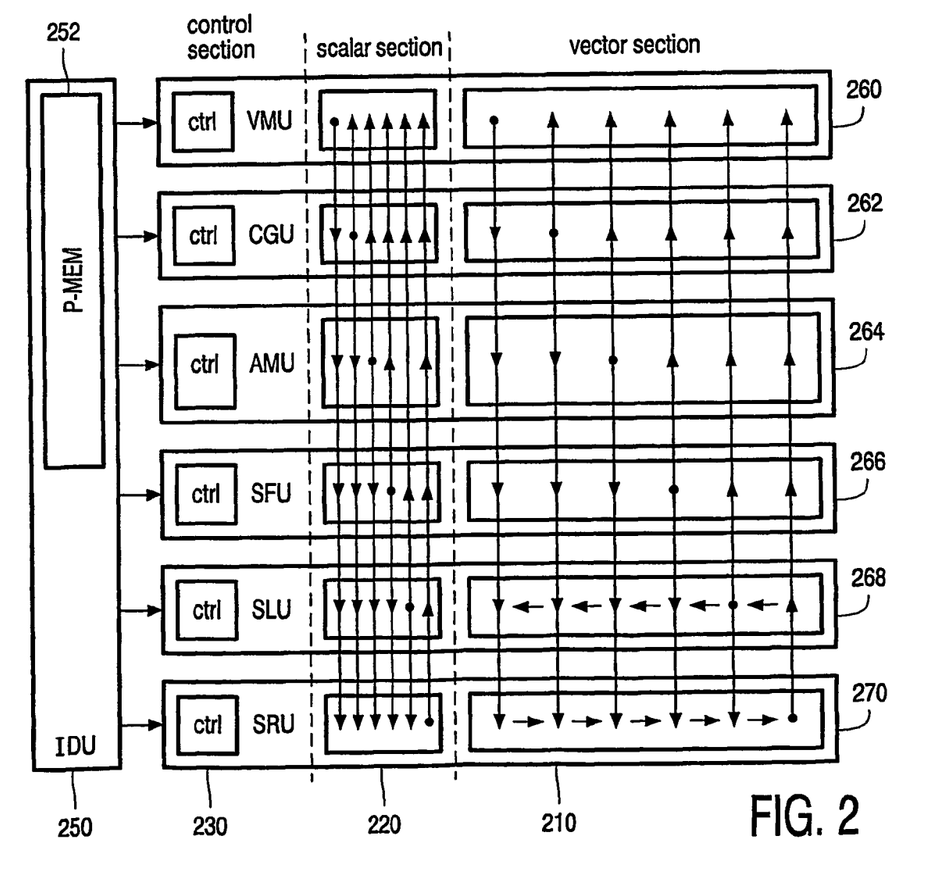
FIG. 2 shows the main structure of the scalar/vector processor according to the invention.

FIG. 2 shows the main structure of the processor according to the invention. The processor includes a pipelined vector processing section 210. To support the operation of the vector section, the scalar/vector processor includes a scalar processing section 220 arranged to operate in parallel to the vector section. Preferably, the scalar processing section is also pipelined. To support the operation of the vector section, at least one functional unit of the vector section also provides the functionality of the corresponding part of the scalar section. For example, the vector section of a shift functional unit may functionally shift a vector, where a scalar component is supplied by (or delivered to) the scalar section of the shift functional unit. As such, the shift functional unit covers both the vector and the scalar section. Therefore, at least some functional units not only have a vector section but also a scalar section, where the vector section and scalar section can co-operate by exchanging scalar data. The vector section of a functional unit provides the raw processing power, where the corresponding scalar section (i.e. the scalar section of the same functional unit) supports the operation of the vector section by supplying and/or consuming scalar data. The vector data for the vector sections are supplied via a vector pipeline.

In the preferred embodiment of FIG. 2, the scalar/vector processor includes the following seven specialized functional units.

Instruction Distribution Unit (IDU 250). The IDU contains the program memory 252, reads successive VLIW instructions and distributes the 7 segments of each instruction to the 7 functional units. Preferably, it contains a loop unit that supports up to three nested levels of zero-overhead looping. In the preferred embodiment, it does not support branches, jumps, or interrupts. The initial program counter is loaded from the stint descriptor, described in more detail below.

Vector Memory Unit (VMU 260). The VMU contains the vector memory (not shown in FIG. 2). During each instruction it can send a line or a vector from the vector memory or receive a line into the vector memory. The same instruction may specify in addition a scalar send operation and/or a receive operation. The VMU is the only functional unit connected to the external world, i.e. to the external bus 110.

The Code-Generation Unit (CGU 262). The CGU is specialized in finite-field arithmetic. For example, the CGU can be used for generating vectors of CDMA code chips as well as related functions, such as channel coding and CRC.

ALU-MAC Unit (AMU 264). The AMU is specialized in regular integer and fixed-point arithmetic. It supports inter-vector operations, where arithmetic is performed element-wise on multiple vectors. In a preferred embodiment, the AMU also provides some intra-vector operations, where arithmetic is performed on the elements within a single vector.

ShuFfle Unit (SFU 266). The SFU can rearrange elements of a vector according to a specified shuffle pattern.

Shift-Left Unit (SLU 268). The SLU can shift the elements of the vector by a unit, such as a word, a double word or a quad word to the left. The produced scalar is offered to its scalar section. Depending on the type of SLU vector-operation issued, the consumed scalar is either zero, or taken from its scalar section.

Shift-Right Unit (SRU 270). The SRU is similar to the SLU, but shifts to the right. In addition it has the capability to merge consecutive results from intra-vector operations on the AMU.

The following table shows that all FUs have a functional vector section 210, where some do not have a control section 230 or scalar section 220.

| Functional Unit | control | scalar | vector |
|---|---|---|---|
| Instruction-Distribution Unit | sequencing, looping | | instruction distribution |
| Vector Memory Unit | address computation | scalar i/o | vector i/o |
| Code-Generation Unit | | | code vector generation |
| ALU-MAC Unit | indexing | broadcast | inter vector: ALU, MAC, mul, . . . |
| Shuffle Unit | | segmentation | intra vector: add, max vector shuffle |
| Shift-Left Unit | | scalar i/o | vector shift |
| Shift-Right Unit | | scalar i/o | vector shift |

The scalar/vector processor according to the invention applies instruction-level parallelism in two major ways:

vector processing, where a single instruction operates on vectors of (scalar) data. This approach is also known as single-instruction stream, multiple-data stream or SIMD.

parallel processing of multiple functional units, each operating on vectors. This can be seen as a (restricted) form of VLIW instruction-level parallelism, Note that these two forms of instruction-level parallelism are independent, and that their effects are cumulative.

Inter-FU Communication

The functional units (FU) operate in parallel. Each FU is capable of receiving and sending vector data. Many FUs are also capable of receiving and sending scalar data.

| FU target | source #inputs | vmu | cgu | amu | sfu | slu | sru |
|---|---|---|---|---|---|---|---|
| vmu | 1 |  | ! | ! | ! | ! | ! |
| cgu | 1 | ! |  | ! | ! | ! | ! |
| amu | 2 | ! | ! |  | ! | ! | ! |
| sfu | 1 | ! | ! | ! |  | ! | ! |
| slu | 1 | ! |  | ! | ! |  | ! |
| sru | 1 | ! |  | ! | ! | ! |  |

All functional units operate in parallel. Upon reception of their segment of an instruction, they input, process, and output data, both vector data and, where applicable, scalar data. Among FUs the communication is strictly among the scalar sections or among vector sections (inter-FU communication). That is, the vector sections of all FUs except the IDU are connected by a pipeline. In a preferred embodiment, this pipeline is configurable on instruction basis. To this end, preferably the FUs are interconnected by an interconnect network, in principle allowing each vector section to receive a vector from any the of other vector sections during each cycle. This feature enables, amongst others, the creation of arbitrary pipelines of the FUs (except the IDU). The six of the functional units that contribute to the vector path can output a vector and send it to other units in parallel during each clock cycle. They can also receive a vector from another unit. The network is nearly fully connected. Only links that are not meaningful have been omitted. The AMU can receive two vectors simultaneously. As shown in FIG. 2, the network is preferably formed by each FU being connected as a signal source (indicated by a disc) to one network path. It is connected to all other paths as a signal sink (indicated by a triangle). The section of the VLIW instruction for the FU indicates from which path it should consume a vector. In this way the pipeline can be configured on an instruction basis. Each path can transfer a full vector, e.g. using 256 parallel wires. Similarly, at least some of the scalar sections of the FUs are connected by a separate pipeline. Preferably, this pipeline is also configurable on instruction basis. The interconnect network among the scalar sections of the FUs can be partial in the sense that no scalar can be sent to or received from a scalar section of at least one FU. Hence, fewer pipeline orderings can be specified. The scalar and vector pipelines can be configured independently. For example, by indicating in the relevant VLIW section both the scalar pipeline and the vector pipeline to be read by the functional unit.

There is no connectivity specified among the control sections of the different functional units. These control sections receive a segment of the VLIW instruction from the IDU, update their own state, and control their respective scalar and vector sections.

Intra-FU Communication

Within an FU there is tight interaction between these sections (intra-FU communication). The interaction is an integral part of the operation of the FU. Examples are the SLU and SRU, where the produced and/or consumed scalar is provided to/taken from the corresponding scalar section part of the FU.

Instructions are typically executed in a single cycle. Exceptions are caused by congestion at the vector memory and manifest themselves as stall cycles.

Data Widths

Figure 3:
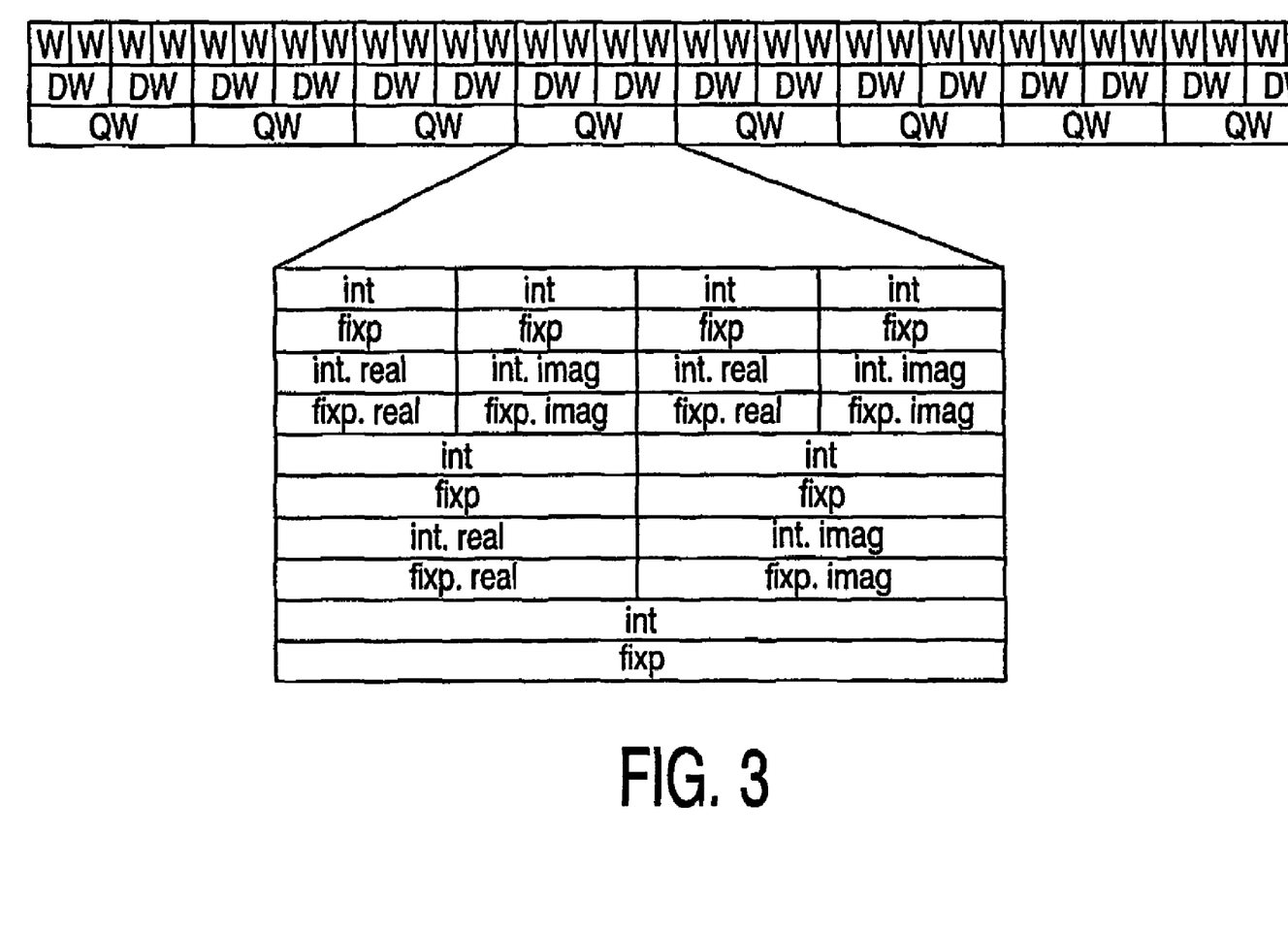
FIG. 3 shows supported data widths and data types.

In a preferred embodiment, the scalar/vector processor supports a plurality of data widths and data types as shown in FIG. 3. The basic unit of memory addressing is a word, also referred to as a single word. Preferably, data width can be a single word (W), double word (DW, or 2W=16 bits)), or quad word (QW or 4W=32 bits). The size of a word is W=8 bits. Preferably, scalars come in three sizes: (single) words, double words, and quad words. A vector has a fixed size of $P_Q$ quad words. It can preferably be structured in one of the three following formats:

$P_Q$ elements of size quad word,
$P_D=2P_Q$ elements of size double word,
$P_S=2P_D=4P_Q$ elements of size (single) word.

The vector-element indexing range is $[0 \ldots 4P_Q-1]$. Hence double words have even indices and the indices of quad words are multiples of four. FIG. 3 gives an overview of the data sizes. The architecture is fully scalable in $P_Q$ and is defined for any vector size $P_Q \geq 1$. However, for most situations it is preferred to choose a power of 2 for $P_Q$. In the preferred embodiment, $P_Q$ is 8, implying a data path width and memory width of 32 words.

Instructions

A CVP instruction is either a control instruction or a VLIW instruction. Control instructions may, for example, be zero-overhead loop initialization. There are no branches, jumps, or subroutines. A VLIW instruction is partitioned into segments, where each instruction segment specifies the operation(s) to be performed by the corresponding functional unit. The segment can be further subdivided in a part for the vector section, and the scalar section (if present). The segment also includes for both parts information on which network part to use for receiving data (one or more vectors for the vector section and one or more scalars for the scalar section).

State of the Scalar/Vector Processor

The state of the CVP is the combined states of its functional units. In the preferred embodiment, it comprises:
the vector memory (part of the VMU);
the program memory (part of the IDU);
vector registers (all functional units);
scalar registers (most functional units);
control registers, including the program counter, and address-offset registers.

In addition to the programmer-visible registers, a CVP realization typically contains additional registers (vector, scalar, and control) for pipelining and caching. These are not part of the CVP instruction-set architecture.

Some of the (vector, scalar, and control) registers are so-called configuration registers. The content of a configuration register can only be loaded from the vector memory; there is no other way to change its value. A configuration register supports the configuration of functional units, and typically defines a function parameter. By storing these "semi-constant" function parameters in configuration registers, both the instruction width and memory traffic are reduced considerably.

An overview of the components of the CVP state is presented in the table below.

| FU | control path | | scalar path | | vector path | | | |
|---|---|---|---|---|---|---|---|---|
| | data | configuration | data | configuration | data | | configuration | |
| vmu | offset 5 | address cu 8 | | | data memory | 2048 | | |
| cgu | | | counter 3 | codes 3 | state | 6 | masks | 2 |
| | | | | | | | polynomials | 2 |
| amu | | | 1 receive 1 | segment size 1 | register file | 16 | | |
| sfu | | | | | register | 1 | shuffle patterns | 4 |
| slu | | | receive 1 | | register file | 2 | | |
| sru | | | receive 1 | | register file | 2 | | |
| idu | pc 1 | loop cu 2 | | | program mem. | 2048 | | |

All programmer-visible registers can be loaded from the vector memory. All registers, except the configuration registers can be saved into the vector memory. By saving the CVP registers at the end of a stint, and by restoring them at a later time, the CVP can continue a particular task as if no other stints were executed meanwhile. These save and restore operations are optional, may be partial, and must be programmed explicitly.

The Memory Unit

Figure 4:
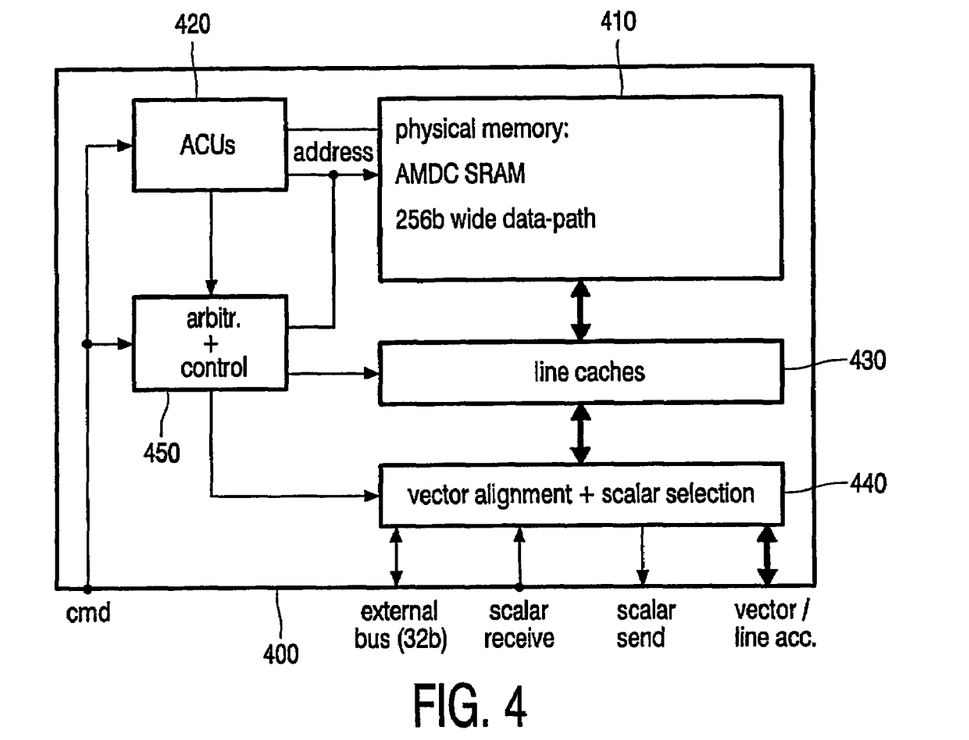
FIG. 4 shows a block diagram of the vector-memory unit.

FIG. 4 shows a block diagram of the memory unit (VMU 400) in which the memory arrangement according to the invention is used. In the preferred embodiment described below, the memory unit is used in a vector processor in combination with a physical memory with a width capable of storing an entire vector. It will be appreciated that the same concept may also be applied to scalar processors, such as conventional DSPs. The VMU contains and controls the vector memory 410, which provides a huge data bandwidth to the other functional units. The physical vector memory 410 is preferably based on a single-ported SRAM. Since embedded SRAMs that are Ps*W wide are not generally available, the physical memory may be formed by one or more banks of wide Random Access Memories (RAM) arranged in parallel. Preferably, the scalar data is stored in the same memory as used for storing the vector data. In such a system, scalars can be intermixed with vectors to which they correspond. For cost-effectiveness and optimum access time to the memory, the memory preferably only allows reading and writing of full vector lines. As such, logically the physical memory consists of lines, each of the size of a vector. To support reading and writing of scalars additional hardware (line caches 430 and support 440 for scalar selection within a line) is used to access the vector-wide physical memory in a scalar fashion.

Figure 5:
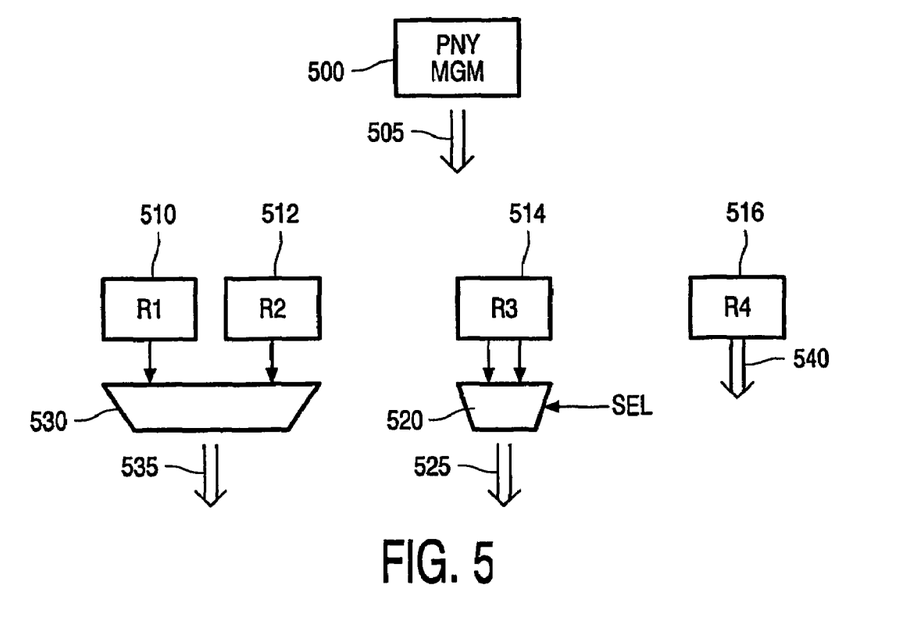
FIG. 5 illustrates using intermediate registers and two port sizes.

FIG. 5 provides more detail of the arrangement. It shows the physical memory 500 with one full width port 505 (in the example, with the width of a vector). In the figure only a read port is shown. A person skilled in the art can easily determine the similar arrangement for writing of data. The arrangement includes at least one register of the same width as the physical memory port 505. Shown are four registers 510, 512, 514, 516. All registers are selectably connectable to the read port 505 for receiving data In the figure, one register 514 is dedicated for reading smaller data elements, in this example: a scalar. Preferably, at least two of the smaller data elements fit in the register. The data register 514 is associated with a read port 525 coupled to a processing unit (or more general: data sink). Preferably a multiplexer 520 is coupled to the register 514 to select the relevant scalar data from the register. The multiplexer may be controlled by the number of the scalar in the register as specified by the least-significant bits of the address (e.g. using a 256 bits vector with 32 8-bit words, the scalar is indicated by the five least significant bits). Multiplexers are known and not described further. The register is connected to the read port 505 of the physical memory for receiving the data (full width). In general there can be Nr scalar read ports, each connected to a vector wide register. This may be separate registers or even the same. The registers are part of the cache 430 of FIG. 4. The multiplexers are part of the scalar selection block 440. Not shown but in a similar way, there can be Nw scalar write ports with Nw vector wide registers present in the cache 430. For each scalar write port, the corresponding register in the cache 430 is connected to a vector-wide de-multiplexer of Nw inputs to select which cache line is written back to the physical memory. When one VMU instruction requires multiple cache lines to be written back, this is done sequentially, stalling all other functional units until all writes have been completed. Accesses to different write ports, but in the same instruction, are not allowed to access the same line in the physical memory. Assuming spatial locality in successive scalar accesses (e.g. successive scalars belonging to one processing loop are stored substantially successively in the physical memory 410), the access frequency to the physical memory 410 to load/store these registers can be significantly below the scalar access frequency to these registers.

In the preferred embodiment, a vector needs not to be aligned at vector boundaries in the memory. As such, a vector consisting of $P_S$ words may have an arbitrary memory address. A memory line has the same size, but its start address is by definition a multiple of $P_S$. (For line accesses, the least significant $^2\log P_S$ bits of the address are ignored.) By allowing arbitrary alignment of vectors (typically alignment on the smallest word boundary), the memory can be utilized better, with less empty locations. Measures are taken for allowing the scalar/vector processor to read/write individual vectors whereas the vector may be stored in two consecutive lines of the physical memory. To this end an alignment unit is used for vector send operations. The alignment unit is shown in block 440 of FIG. 4. More detail is given in FIG. 5. The alignment unit 530 is connected to two line caches 510 and 512 (i.e. to two vector wide registers), containing both lines spanned by the requested vector. When consecutive vectors are accessed, only one new line has to be fetched from the physical memory, since the other one is still present in one of these line caches. The parts of the two cached lines that form the requested vector are combined with a network consisting of multiplexers 530, and then stored in a vector-wide pipeline register. The pipeline register receives the data via a vector read port 535. From the pipeline register, the value is transmitted on the VMU broadcast bus.

FIG. 5 also shows a further vector wide register 516 and associated vector wide read port 540 that enables direct reading of a line from the memory, where the register acts as a cache.

Preferably, caching around the vector memory is hidden from the programmer. Despite the use of caches to emulate a multi-port vector memory with a single-port SRAM, the programmer can then assume a coherent vector memory. Since each register can contain a copy of possibly the same data in the physical memory, coherency should then be maintained automatically instead of the programmer having to guard coherency. To this end, a check is performed for address conflicts, i.e. has a write to a register occurred for a line address, where the same line is also stored in one of the other registers. For such a check it is sufficient to store for each register, the line address (most significant part of the address) of the line stored in the register. If a possible conflict is detected, a correction measure can be taken. For example, a read register is marked as invalid as soon as a write operation has occurred to a register with the same line. No further use can be made of the register unless it has been read again from the physical memory (after the write register has first been written back to the memory). Alternatively, the content of a write register may be copied to all read registers with the same line after a write has occurred to the write register. A third possibility is to share registers among read and write ports. This latter approach requires additional vector-wide multiplexers, increasing costs, but offers a performance advantage. In fact, a bypass is created where a read register connected to a reads port is bypassed and data is actually read from a write register through the read port. All these corrective measures take place using functionality collectively referred to as 'coherency checker'. To determine where possibly data is stored in a copied form (with a possible consistency problem) coherency register are used that store information on the content stored in the data register with which the coherency register is associated. The coherency register preferably stored the physical address of the data stored in the corresponding data register. The same coherency checks and measures can also be taken for vector reads where the vector is (partially) stored in a register pertaining to a write port, instead of only for access to scalars. Preferably, a line read or write to the physical memory is performed in a single clock cycle by means of a single access to the physical memory 510.

The vector-memory unit can support up to four concurrent "sub-operations" in a single VMU instruction:

send a vector, or send a line, or receive a line from/to VM location;
send a scalar from a VM location;
receive a scalar to a VM location;
modify the state/output of an address computation unit.

VMU_cmd=(vopc, aid_v, ainc_v, sopc, aid_s, ainc_s, size, srcv, aid_r, ainc _r, aopc, aid_a, imm_addr)
vopc=NOP|SENDL|SENDV|RCVL_CGU|RCVL_AMU|RCVL_SFU|RCVL_SLU|RCVL_SRU
Aid_v={0, . . . , 7}
Ainc_v=NOP|INC
sopc=NOP|SEND
aid_s={0, . . . , 7}
ainc_s=NOP|INC
size=WORD|DWORD|QWORD
srcv=NONE|VMU|AMU|SLU|SRU
aid_r={0, . . . , 7}
ainc_r=NOP|INC
aopc=NOP|IMM|LDBASE|LDOFFS|LDINCR|LDBOUND
aid_a={0, . . . , 7}
imm_addr={0.0, . . . , 524288.31}|{−262144.0, . . . , 262143.31}

The VMU instruction may take a variable number of clock cycles, depending on the number of sub-operations and the continuity of address sequences.

The VMU inputs/outputs are:

| | Explanation |
|---|---|
| Input | |
| Cmd | VMU command |
| rcv_amu | AMU vector receive bus |
| rcv_cgu | CGU vector receive bus |
| rcv_sfu | SFU vector receive bus |
| rcv_slu | SLU vector receive bus |
| rcv_sru | SRU vector receive bus |
| s_rcv_amu | AMU scalar receive bus |
| s_rcv_slu | SLU scalar receive bus |
| s_rcv_sru | SRU scalar receive bus |
| Output | |
| Snd | VMU vector result |
| s_snd | VMU scalar result |

In addition there are two scalar ports (one send, one receive) to be connected to the external bus. Synchronization of these memory accesses with CVP instructions is the task of the micro-controller 130.

The VMU vector section contains the physical vector memory 510:

| Name | Explanation |
|---|---|
| mem[4096][32] | Vector memory: 4096 lines of 32 words each |

Note that vector sub-operations cannot access the scalar memory. Hence, the most significant address bit is ignored for vector sub-operations. The vector section of the VMU supports seven sub-operations, encoded in the VOPC field of the instruction: vector send (SENDV), line send (SENDL), and five line receive sub-operations (RCVL_CGU, RCVL_AMU, RCVL_SFU, RCVL_SLU, and RCVL_SRU). The functional unit that is the source of the receive is explicitly encoded in the corresponding line receive sub-operation. The read address or write address for each sub-operation is specified by a corresponding address computation unit. The AINC_V field is shared between all vector sub-operations. It will be passed on to the ACU encoded in the AID_V field. The AINC_V field specifies whether the affected address computation unit should perform a post-increment operation.

| Guard | Transition |
|---|---|
| vopc = NOP | None |
| vopc = SENDL | snd = mem.line[acu[aid_v].out] |
| vopc = SENDV | snd = mem.vector[acu[aid_v].out] |
| vopc =RCVL_CGU | mem.line[acu[aid_v].out] = rcv _cgu |
| vopc = RCVL_AMU | mem.line[acu[aid_v].out] = rcv _amu |
| vopc = RCVL_SFU | mem.line[acu[aid_v].out] = rcv_sfu |
| vopc = RCVL_SLU | mem.line[acu[aid_v].out] = rcv_slu |
| vopc = RCVL_SRU | mem.line[acu[aid_v].out] = rcv _sru |

Note that the operations are cast as send (or receive) actions, and not as load (or store) actions involving a destination (or source). The latter are specified by operations in other functional units. A line send is functionally equivalent to a vector send with the same address. Line-send sub-operations are typically used to configure functional units, or to restore the state of a task in the various registers. By introducing a special mode for line send, the access times of successive vector sends ("vector streaming") can be optimized through efficient usage of caches.

The scalar sub-operation of the VMU is encoded in the SOPC field of the instruction. It supports only one sub-operation: scalar send (SEND). The read address is specified by the address computation unit specified in the AID_S field. The AINC_S field of the instruction specifies whether this address computation unit should perform a post-increment operation. The operand size (WORD, DWORD or QWORD) of the scalar sub-operation is determined by the SIZE field of the instruction.

| Guard | Transition |
| --- | --- |
| sopc = NOP | None |
| sopc = SEND && size = WORD | S_snd = mem.word[acu[aid_s].out] |
| sopc = SEND && size = DWORD | S_snd = mem.dword[acu[aid_s].out] |
| sopc = SEND && size = QWORD | S_snd = mem.qword[acu[aid_s].out] |

The scalar receive sub-operation of the VMU is encoded in the SRCV field of the instruction. If its value is NONE, no scalar receive is performed. Otherwise, the SRCV field of the instruction determines which functional unit will be used as source for the scalar receive. The write address is specified by the address computation unit specified in the AID_R field. The AINC_R field of the instruction specifies whether this address computation unit should perform a post-increment operation. The operand size (WORD, DWORD or QWORD) of the scalar receive sub-operation is determined by the size of the source scalar.

| Guard | Transition |
| --- | --- |
| srcv = NONE | None |
| srcv = VMU | mem.scalar[acu[aid_r].out] = s_rcv_vmu |
| srcv = AMU | mem.scalar[acu[aid_r].out] = s_rcv_amu |
| srcv = SLU | mem.scalar[acu[aid_r].out] = s_rcv_slu |
| srcv = SRU | mem.scalar[acu[aid_r].out] = s_rcv_sru |

The send and receive sub-operation can be combined into a scalar move operation, from one VM location to another. The address for each access is specified by a corresponding address computation unit.

The VMU control section 550 is mainly a set of address-computation units (ACU) or address generation units (AGU) that support addressing modes like those in conventional DSPs. Such a unit performs one or more address calculations per instruction without using the processor's main data path. For example, the address of a scalar can be post-incremented after each scalar read access. This allows address calculation to take place in parallel with arithmetic operations on data, improving the performance of the processor. Depending on the set of addressing modes supported, such an ACU needs access to a number of registers. For example, Relative addressing, i.e. addressing relative to a so-called base address, requires a base register base The offset with respect to the base address is stored in an offset register offs Pre/post increment the offset by a value stored in an increment register incr Modulo addressing with respect to an address stored in a bound register bound With this set of addressing modes, the following can be supported. Assume an offset register offs. After each memory access (read or write) at address base+offs, register offs is updated according to offs:=(offs+incr) modulo bound. Hence, offs changes frequently (after every access), whereas the values stored in base, incr, and bound change infrequently. Typically those three latter registers are initialized prior to a program loop. The operation of the ACU is not described in detail here.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim.

The invention claimed is:

1. A processing system with a processor and a physical memory with a single-size memory port for accessing data in the memory; the processor being arranged to operate on data of at least a first data size and a smaller second data size; the first data size being equal to or smaller than the memory port size; the processing system Including;
   at least one data register of the first data size connected to the memory port; and
   at least one data port of the second data size connected to the data register and the processor for enabling access to data elements of the second size.

2. A processing system as claimed In claim 1, wherein the memory port size is at least twice the second data size.

3. A processing system as claimed in claim 2, wherein the data port is a write port and the processor includes a de-multiplexer for inserting a data element of the second data size at a selectable location in the data register under control of a write address.

4. A processing system as claimed in claim 1, wherein the processing system includes a plurality of data ports of the second data size connected to the processor and for each of the data ports an associated respective data register connected to the respective data port and to a port of the physical memory.

5. A processing system as claimed in claim 1, wherein the physical memory comprises a single-ported SRAM.

6. A processing system as claimed in claim 1, wherein the memory is embedded in the processor.

7. The processing system of claim 1, further comprising an allgnment unit connected between the memory port and the data port, for processing two separate lines of the physical memory to provide data of the first data size having a first part stored in a first one of the two separate lines, and a second part store in a second one of the two separate lines.

8. The processing system of claim 7, wherein the processing system includes a plurality of data ports of the second data size connected to the processor and for each of the data ports an associated respective data register connected to the respective data port and to a port of the physical memory.

9. The processing system of claim 7, wherein the data port is a read port and the processing system includes a multiplexer for selecting and extracting a data element of the second data size from the data register under control of a read address.

10. The processing system of claim 7, wherein the data port is a write port and the processor includes a de-multiplexer for inserting a data element of the second data size at a selectable location in the data register under control of a write address.

11. The processing system of claim 7, wherein the memory port size is at least twice the second data size.

12. A processing system with a processor and a physical memory with a single-size memory port for accessing data in the memory; the processor being arranged to operate on data of at least a first data size and a smaller second data size; the first data size being equal to or smaller than the memory port size; the processing system including:
at least one data register of the first data size connected to the memory port; and
at least one data port of the second data size connected to the date register and the processor for enabling access to data elements of the second size,
wherein the memory port size is at least twice the second data size, and
wherein the data port is a read port and the processing system includes a multiplexer for selecting and extracting a data element of the second data size from the data register under control of a read address.

13. A processing system with a processor and a physical memory with a single-size memory port for accessing data in the memory; the processor being arranged to operate on data of at least a first data size and a smaller second data size; the first data size being equal to or smaller than the memory port size; the processing system including:
at least one data register of the first data size connected to the memory port; and
at least one data port of the second data size connected to the data register and the processor for enabling access to data elements of the second size,
wherein the data port is a write port, and the processing system includes a coherency checker that includes for the data register an associated coherency register for storing information identifying data stored in the data register; the coherency checker being operative to check whether data intended to be read from the memory is consistent with data stored in the data register by comparing a read address for accessing the memory with the identifying information stored in the coherency register.

14. A processing system as claimed in claim 13, wherein the identifying information includes a physical address for accessing a word in the physical memory where the word has a width of the memory port.

15. A processing system as claimed in claim 13, wherein the coherency checker includes a conflict resolver for, in response to detecting a possible consistency conflict, taking corrective steps.

16. A processing system as claimed in claim 15, wherein the conflict resolver is arranged to take corrective steps by marking the data register as invalid for read access, causing a re-loading of content of the data register from the memory in response to a read access to the data register.

17. A processing system as claimed in claim 15, wherein the processing system includes a plurality of data ports of the second data size connected to the processor and for each of the data ports an associated respective data register connected to the respective data port and to a port of the physical memory, and wherein at least one of the data registers (hereinafter "read register) is connected to a read data part and at least one of the data registers (hereinafter "write register") is connected to a write data port; and the processor includes a bypass path for selectably providing data from the write register to the read data port; the coherency checker including for each respective data register a coherency register for storing information identifying data stored in the associated data register; the conflict resolver being arranged to take corrective steps by in response to writing data into the write register activating the bypass path for successive read access to the read register if the read register according to the identifying information should store the same data element.

18. A processing system as claimed in claim 17, wherein the physical memory is formed by a plurality of banks of RAM arranged in parallel.

19. A processing system as claimed in claim 1, wherein the processor is arranged to operate on vectors of the first data size and scalars of the second data size, where the first data width is at least twice the second data width.

20. A processing system as claimed in claim 13, wherein the processing system includes a plurality of data ports of the second data size connect to the processor and for each of the data ports an associated respective data register connected to the respective data port and to a port of each physical memory, and the coherency checker includes a coherency register for each respective data register for storing information identifying data stored in the respective data register; and the corrector being arranged to, in response to write access to one of the data registers and/or write access to the physical memory, take corrective steps by copying content written to the data register or the memory to all other data registers and/or a location in the memory that according to the identifying information stores the same data.

* * * * *